(12) United States Patent
Mehalel

(10) Patent No.: US 6,412,038 B1
(45) Date of Patent: Jun. 25, 2002

(54) INTEGRAL MODULAR CACHE FOR A PROCESSOR

(75) Inventor: Moty Mehalel, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,986

(22) Filed: Feb. 14, 2000

(51) Int. Cl.[7] ................................................ G06F 12/08
(52) U.S. Cl. ........................ 711/3; 711/128; 711/172; 711/212; 365/51
(58) Field of Search .......................... 711/128, 3, 172, 711/212; 365/51

(56) References Cited

U.S. PATENT DOCUMENTS 5,014,195 A    5/1991  Farrell et al. ............... 711/128
5,202,968 A    4/1993  Sato ........................... 711/120
5,812,418 A    9/1998  Lattimore et al. ............. 716/8
5,857,214 A *  1/1999  Dey ........................... 711/212

FOREIGN PATENT DOCUMENTS

| EP | 0 285 172 A2 | 3/1988 |
| EP | 0 549 508 A1 | 11/1992 |
| WO | WO 99/13404 | 8/1998 |

* cited by examiner

Primary Examiner—Reginald G. Bragdon
(74) Attorney, Agent, or Firm—Jeffrey S. Draeger

(57) ABSTRACT

An integral modular cache. One embodiment includes a processor portion and a cache memory portion. The cache memory portion includes an array portion having tag logic and a set portion. The array portion extends along substantially all of a first axis of the processor. Control logic is to receive a cache size indicator and is capable of operating the cache with the one set portion or with additional set portions.

16 Claims, 8 Drawing Sheets

INTEGRAL MODULAR CACHE FOR A PROCESSOR

BACKGROUND

1. Field of the Disclosure

The present disclosure pertains to the field of cache memories and particularly to the field of cache memories integrated with a data processing component.

2. Description of Related Art

Providing a number of cache size options for a product such as a microprocessor having an integrated cache may be highly beneficial. Different cache sizes typically have relatively predictable impacts on performance. Therefore, offering products with different cache sizes advantageously allows one to market the different products at different performance levels.

Moreover, the different cache sizes typically translate substantially directly into total area required for the integrated circuit die. Accordingly, the price of the die may be partially controlled by choosing the amount of cache memory to include. Unfortunately, typical caches on integrated circuits with other processing logic are not easily resized such that the entire die size can be changed.

In some prior art systems, system caches remain apart from integrated circuits such as microprocessors. For example, some of the original Pentium™ Processors available from Intel® Corporation of Santa Clara, Calif. did not include a second level (L2) cache. A separate system cache may have been used, and that cache size could be adjusted by altering the particular cache component plugged into the system and perhaps the control logic used in the system. Later, some Pentium Processors included an L2 cache in a multi-chip module. In these processors, discrete static random access memory (SRAM) chips were included within the same module. Again, by altering the number or size of the SRAM chips, the size of the L2 cache was easily variable.

Currently, some processors integrate the L2 cache on die. It is expected that L2 and/or other additional such integration will continue in the future. Unfortunately, when a cache (or other memory structure) is integrated onto a single integrated circuit which includes other logic, changing the cache size typically becomes more difficult that merely replacing a module such as a discrete SRAM or a system level cache chip. The control logic for the cache (e.g., sense amps, set and way control logic, tag control logic, and the like) is not inherently divided as is a cache array and therefore may be integrated or synthesized within a region such that portions may not be easily excised. Moreover, a cache control circuit for an integrated cache typically is not designed to operate properly if a portion of the cache array is removed. A prior art cache array typically expects certain responses from the array and would not function properly if portions of the array were removed.

For example, a prior art processor 100 is shown in FIG. 1. The processor includes a cache 110 that has cache array(s) 130 (e.g., data, parity, tag, etc.) which may be organized into various set and way arrangements. Control logic 120 is a single block that communicates with and controls the array(s) 130. Thus, there is no simple manner of removing sets or ways.

Additionally, the overhead of altering a large integrated circuit is indeed typically quite substantial. For example, integrated circuits are typically produced using a series of optical masks. These masks are generally produced after a product design is complete, validation is performed, and a tapeout process is completed. Any alteration of the actual circuitry involved requires that substantial time consuming validation be again performed. Thus, the unified nature of the control block and/or any logic sharing that requires alteration to change cache sizes may detrimentally increase the time required to implement such a change.

Moreover, a traditional integrated cache is typically physically placed on a die in a convenient fashion with respect to the other functional blocks. This typically results in a cache being isolated to a portion of any axis of the die. For example, in FIG. 1, the cache occupies only a portion of both of the X and Y axes. A removal of either a set or a way would create a hole in any rectangular die. Thus, removing a portion of the cache would not help reduce costs as the die size would remain the same (assuming traditional rectangular die lines are maintained). In order to easily change the size of the cache, the logic of the entire processor 100 may need to be rearranged, again requiring time consuming validation steps to be performed. Die re-arrangement also typically alters distances between some signal drivers and receivers, thereby disadvantageously altering timing arrangements between circuits and potentially requiring accommodating modification.

Thus, size changes for traditional integrated caches may disadvantageously require time consuming circuit changes and validation due to the alteration of control circuitry. Moreover, traditional caches may not be physically situated to allow a straightforward die size alteration in conjunction with a cache size change.

BRIEF DESCRIPTION OF THE FIGURES

The present invention is illustrated by way of example and not limitation in the figures of the accompanying drawings.

DETAILED DESCRIPTION

The following description provides an integral modular cache for a processor. In the following description, numerous specific details such as numbers of cache modules, sets, ways, signal names, address bits, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement appropriate logic circuits without undue experimentation.

Presently disclosed techniques provide a cache memory that allows relatively easy size alterations. A relatively easy alteration involves little or no change in the cache control logic such that not all validation efforts have to be performed again to allow production of the product with the modified cache size. The need for such easily alterable caches is particularly acute, although not solely applicable, in the arena of high integration products where the cache is a portion of a larger die. Described techniques advantageously allow parts with numerous cost and performance price points to be relatively easily produced from a base product.

Figure 1:
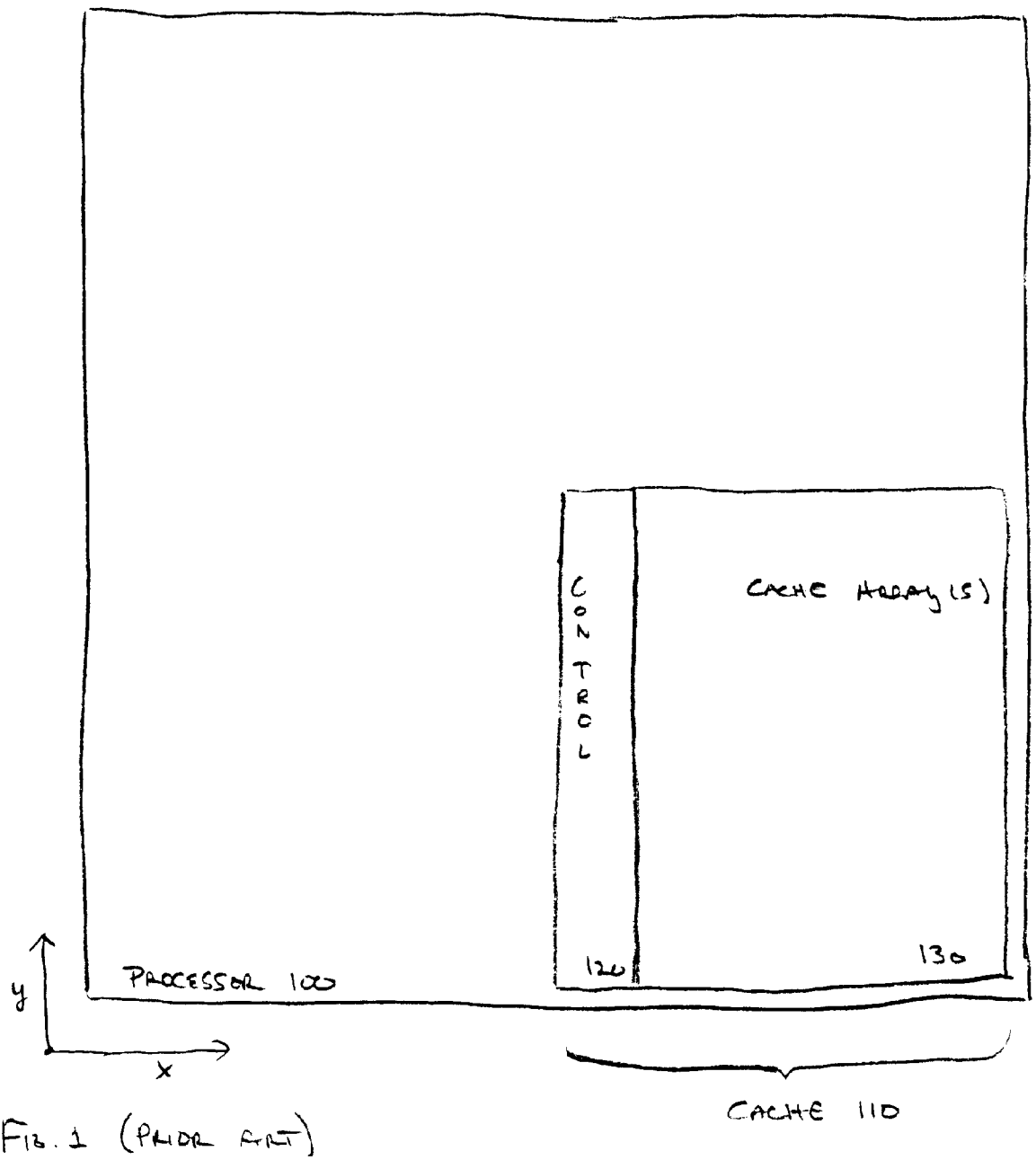
FIG. 1 illustrates a prior art processor having an integrated cache.
Figure 2:
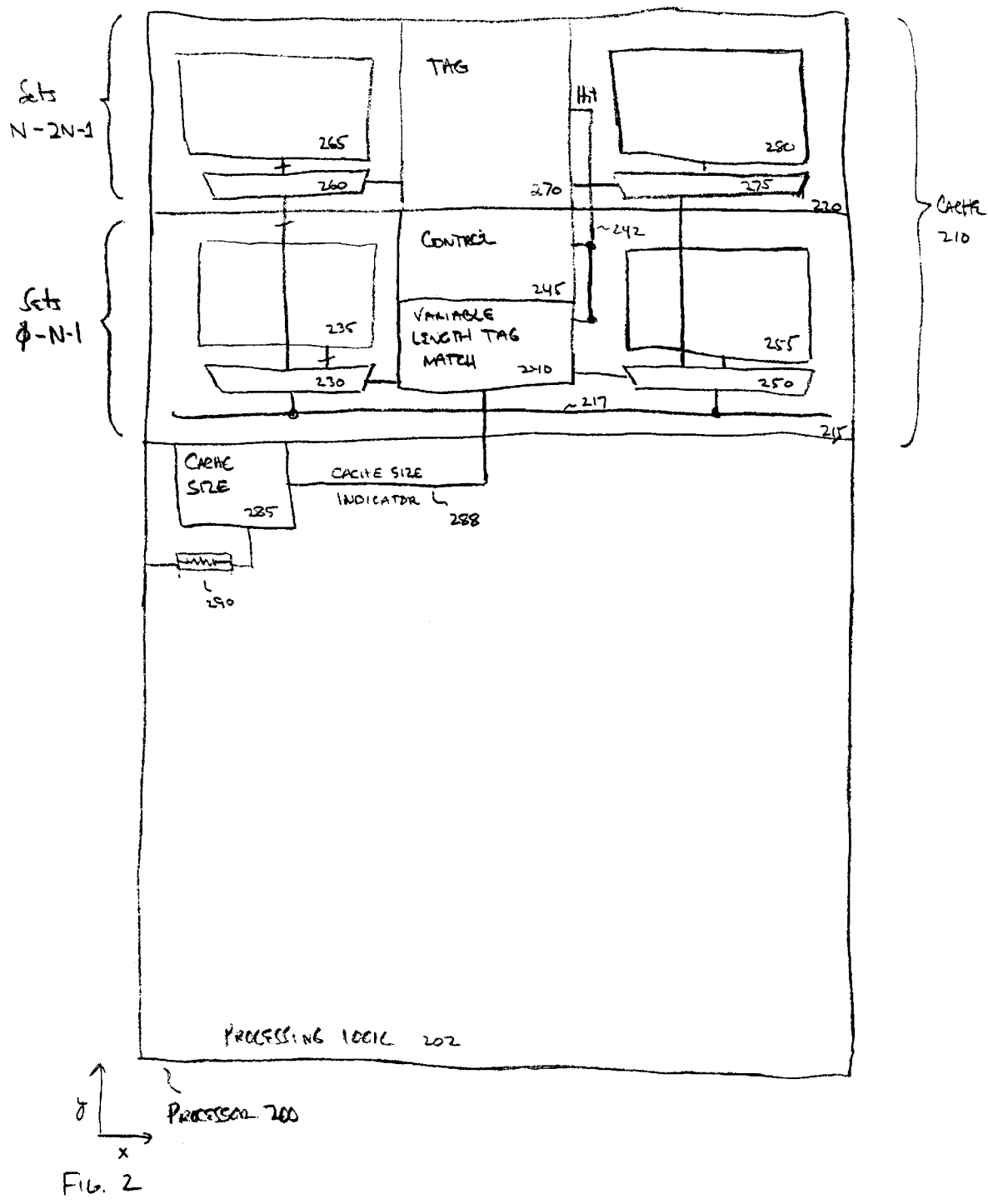
FIG. 2 illustrates one embodiment of a processor having an integral modular cache with two modules.

FIG. 2 illustrates one embodiment of a processor 200 having a modular cache 210. A modular cache, as discussed herein, is a cache that has portions or modules that are relatively easily removed from the integrated circuit. That is, such portions may be removed without rendering inoperative the remaining cache and control logic portions. The control logic of the modular cache may, however, receive an indication of the existing cache size to ensure proper operation.

The processor 200 includes processing logic 202 and the modular cache 210. The processing logic 202 may process instructions for a general purpose computer system or may perform more specialized processing tasks for appliances or tasks related to networking, communication, or digital signal processing. In the embodiment of FIG. 2, the cache 210 may be one of two sizes. The cache 210 may include only a bottom half (sets 0–N–1), or may include the bottom half and a top half (sets N–2N–1). The cache size may be selected using a programmable fuse 290 in conjunction with cache size logic 285 that generates a cache size indicator on a signal line 288. The cache size indicator is provided to variable length tag match logic 240.

The variable length tag match logic 240 performs tag matching to compare incoming read request addresses against tags stored in a tag array. Depending on the size of the cache, a different number of tag match operations may be performed. For example, in the case where only the bottom half of the cache 210 is included in the processor 200, a number $S_0$ of bits may be required to represent the N sets. Thus, the address may be broken down into T tag bits and $S_0$ set bits. When the cache 210 is doubled to include 2N sets, another bit is required to represent the 2N sets. Thus, one less tag bit may be used, and the variable length tag match logic 240 may disregard one of the tag bits. As is further discussed below, this technique may be extended to support a cache with a variety of different sizes.

Control logic 245 is coupled to receive one or more hit signals on signal line(s) 242. Hit signals from the upper half may be generated by tag logic 270, and hit signals from the lower half may be generated by the variable length tag match logic 240. In some embodiments, the tag logic of both the upper and lower half may be identical, making them more modular. In other embodiments, however, it may be possible to simplify the tag logic 270 of the top half since the top half may not need to perform variable length tag matching in this two-module embodiment.

Assuming a match occurs in the top half, data may be read from an array 265 or an array 280 respectively through multiplexers 260 and 275. The data may be passed along to multiplexers 230 and 250 in the bottom half. The cache size indicator may be logically combined with the address bit that is the highest order bit of the set number to select either the top or bottom half of the cache to provide data through multiplexers 230 or 250 to a bus 217. Thus, if the cache size indicator indicates that only the bottom half of the cache is present in the processor 200, the multiplexers 230 and 250 do not select the top half. If the cache size indicator indicates that the top half is present in processor 200, the multiplexers 230 and 250 select the bottom half when data is found in one of sets 0–N–1 and select the top half when data is found in one of sets N–2N–1.

In alternative embodiments, substitutes for these multiplexing structures may be used. For example, a tri-state structure may be used by each portion of the cache to drive data to the bus 217. Such a tri-state implementation may be more amenable to further modular extension to numerous different cache sizes. In either implementation, if a cache access implicates the top half of the range of available sets, data is read from or passed along to the top half of the cache. If the top half of the cache is not present, the location is mapped into the bottom half of the cache.

Advantageously, this design allows the insertion or removal of the top half of the cache without requiring changes to the control circuitry for the cache. The control circuitry may be operated in either mode simply by changing the cache size indicator signal input to the cache. If the top half is missing, no hits will be received from the top half, and no data will be multiplexed to the bus 217 from the top half. All locations are mapped to the bottom half when the top half is not present. Since no circuitry redesign is required, a processor with different size caches may be easily produced. The control circuitry need not passed through extensive validation procedures when the cache sizes changed because the control logic is not itself change.

Additionally, as illustrated in FIG. 2, since the upper module (sets N–2N–1) extends across substantially all of the x-axis of the processor 200, the removal of this upper module translates directly into a die size reduction. Accordingly, different die sizes with different cache sizes may easily be produced to address different marketing needs. Notably, I/O logic may be provided at the very edges of the integrated circuit die. Therefore, the cache modules may not span an entire axis of the die. The I/O logic, however, may be moved as cache modules are inserted or removed.

Figure 3:
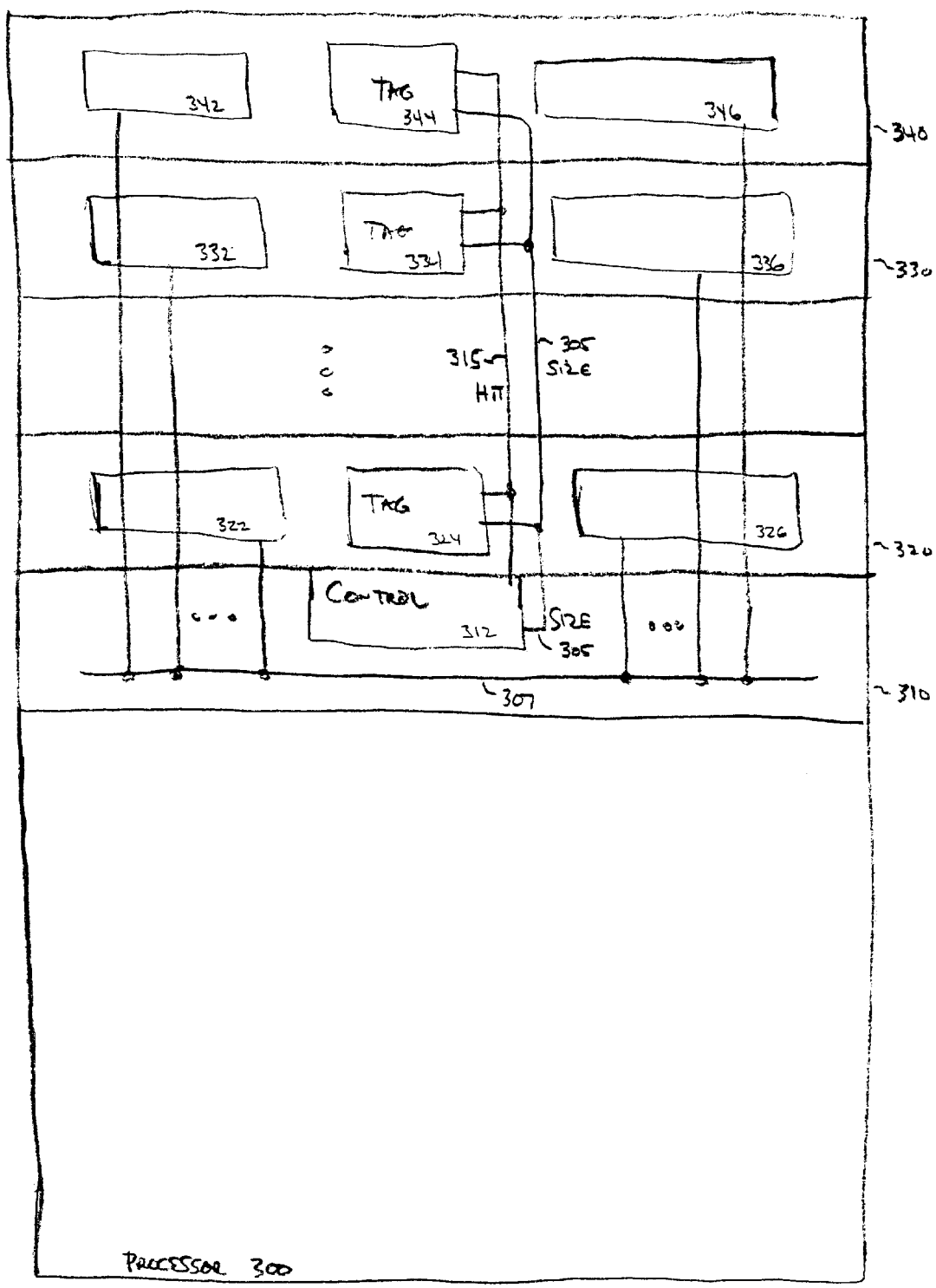
FIG. 3 illustrates one embodiment of an integral modular cache with a variable number of modules.

FIG. 3 illustrates one embodiment of a processor having a plurality of different cache modules. In this embodiment, individual modules 320, 330, and 340 are part of an N module modular cache. Module 320 includes an array 322, tag logic 324, and an array 326. Module 330 includes an array 332, tag logic 334, and an array 336. Likewise, module 340 includes an array 342 tag logic 344, and an array 346. Each module may generate hit signals on a hit bus 315. A cache size indicator may be generated on a cache size bus 305 by control logic 312. Each of the arrays from each module may drive a bus 307 using tri-state logic. The various arrays and tag logic may be rearranged in other embodiments. For example, the arrays for each module may be unified or may be further divided. Additionally, the tag logic may be physically located in positions other than the middle of the x axis of the die.

The hit bus 315 may be a single signal line which is aligned in a predetermined physical position on the die. If additional modules are added they may be coupled to the same signal line to indicate when a hit occurs. Alternatively, a set of hit lines may be provided, with some lines remaining unconnected and therefore deasserted when fewer than the maximum number of cache modules are present. Similarly, data buses from the various modules may be physically aligned so that additional modules connect directly to the pre-existing buses. These aligned hit and data paths allow new modules to be added without circuit or signal line rearrangement. Again, obviating the need for signal line or circuit rearrangement reduces the validation procedures required to produce a processor with a different cache size.

Figure 4:
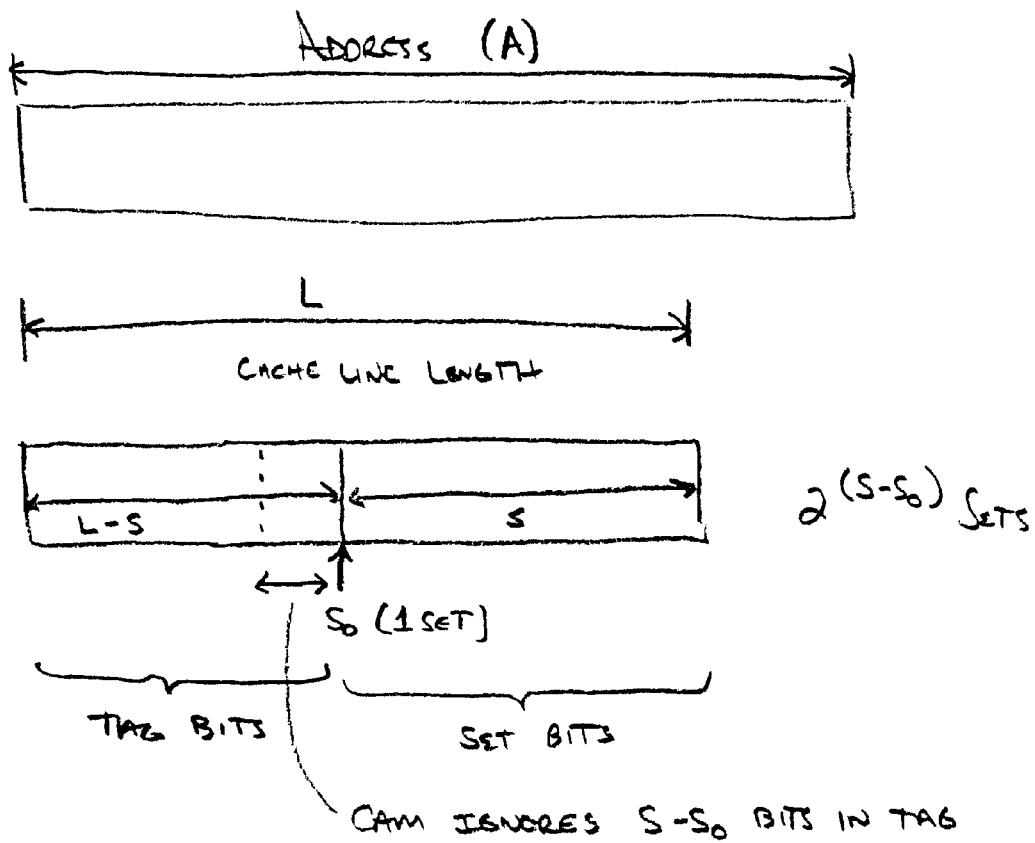
FIG. 4 illustrates one embodiment of a technique for separating addresses into sets and ways for an variably sized integral modular cache.
Figure 5:
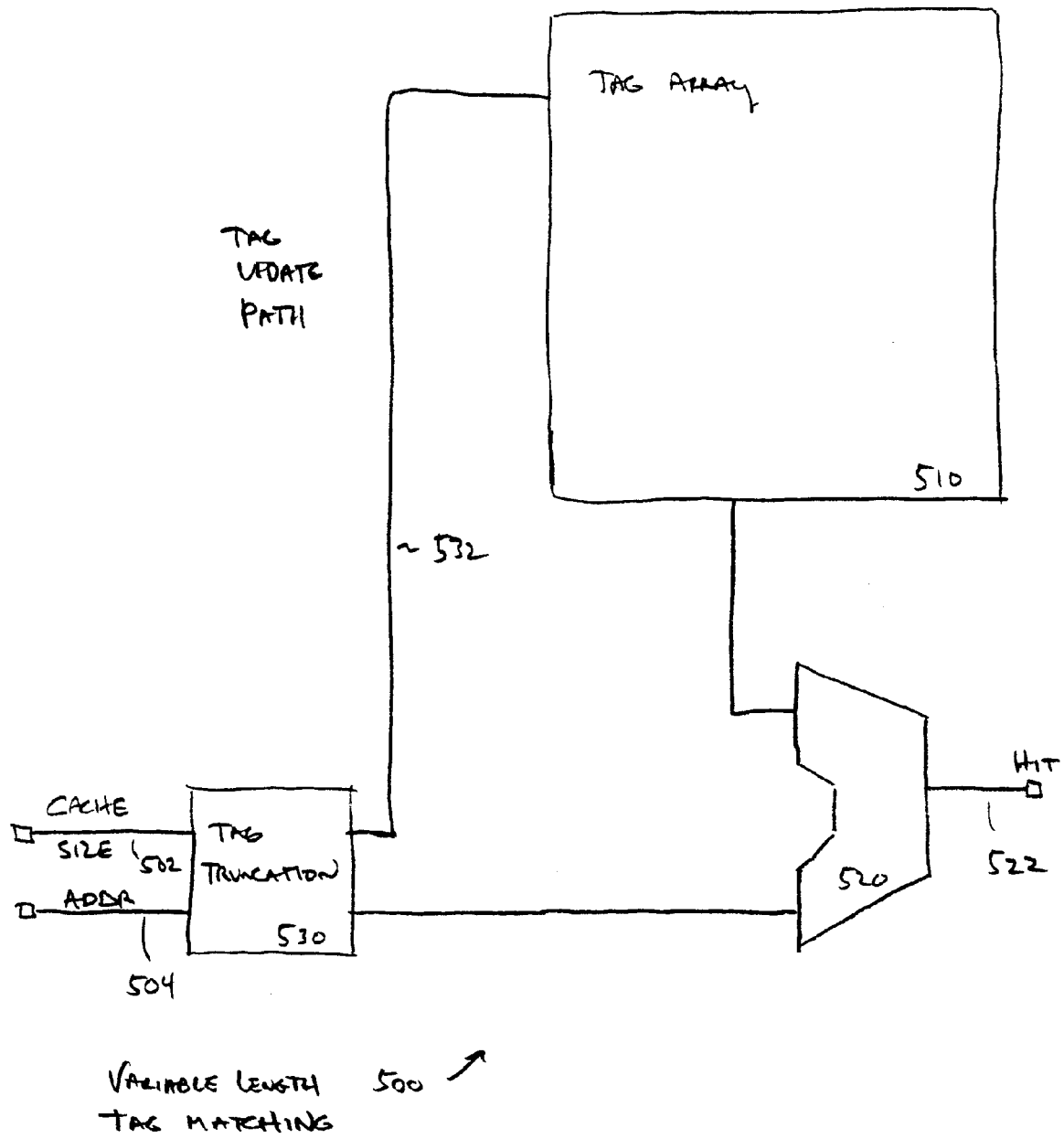
FIG. 5 illustrates one embodiment of variable length tag matching logic.

FIGS. 4 and 5 illustrate additional details of variable length tag matching as may be used in some embodiments. As indicated in FIG. 4, an address may have A bits in a particular system. The number of bits needed to represent a cache line is typically fewer than A, and is designated L in the illustrated embodiment. When the smallest cache size is used, $S_0$ bits are used to represent the number of sets. Thus, there are $2^{S_0}$ ($2^{\wedge}S_0$) sets in the smallest cache size. This leaves $L-S_0$ tag bits in the smallest cache size.

The cache may be multiplied in size by powers of two (1, 2, 4, 8, etc.). Each power of two requires an additional bit to represent the number of sets in the cache. Thus the number of sets, S, increases from $S_0$. The number of tag bits accordingly decreases (to L–S) when the cache size is increased. The variable length tag match logic (which may be a content addressable memory (CAM)) thus ignores the $(S-S_0)$ least significant bits in the tag.

In one embodiment, a 32-bit address may be used, with bits 31:5 representing the cache line address (L=27). The cache may be either 256 kilobytes (k) or 128k, with 1024 sets in the former case and 512 in the latter. In this embodiment, there are 9 set bits ($S_0$) in 128k mode and 10 set bits in 256k mode. Thus, the tags are respectively 18 and 17 bits long. Set bit 14 may be used to select a multiplexer between top and bottom modules, and address bit 14 may be ANDed with a cache size indicator that has an active high value indicating 128k cache size to perform tag truncation. That is, the tag may be Address[31:14] with the Address[14] bit ANDed with a cache size indicator.

An appropriate variable length tag matching circuit 500 for a variety of cache sizes is shown in FIG. 5. A tag truncation circuit 530 receives the cache size indicator on a signal line 502 and an incoming address on a signal line 504. The tag truncation circuit may set $(S-S_0)$ tag bits to a predetermined value (e.g., logical 0). Thus, a truncated tag is stored in the tag array 510 when a cache write occurs via tag update path 532. Similarly, a truncated tag is compared by a comparator 520 to the value retrieved from the tag array 510 when a tag comparison operation is performed. Accordingly, variable length comparisons may be performed using a single tag array and comparison structure by simply changing a cache size indicator input.

Figure 6:
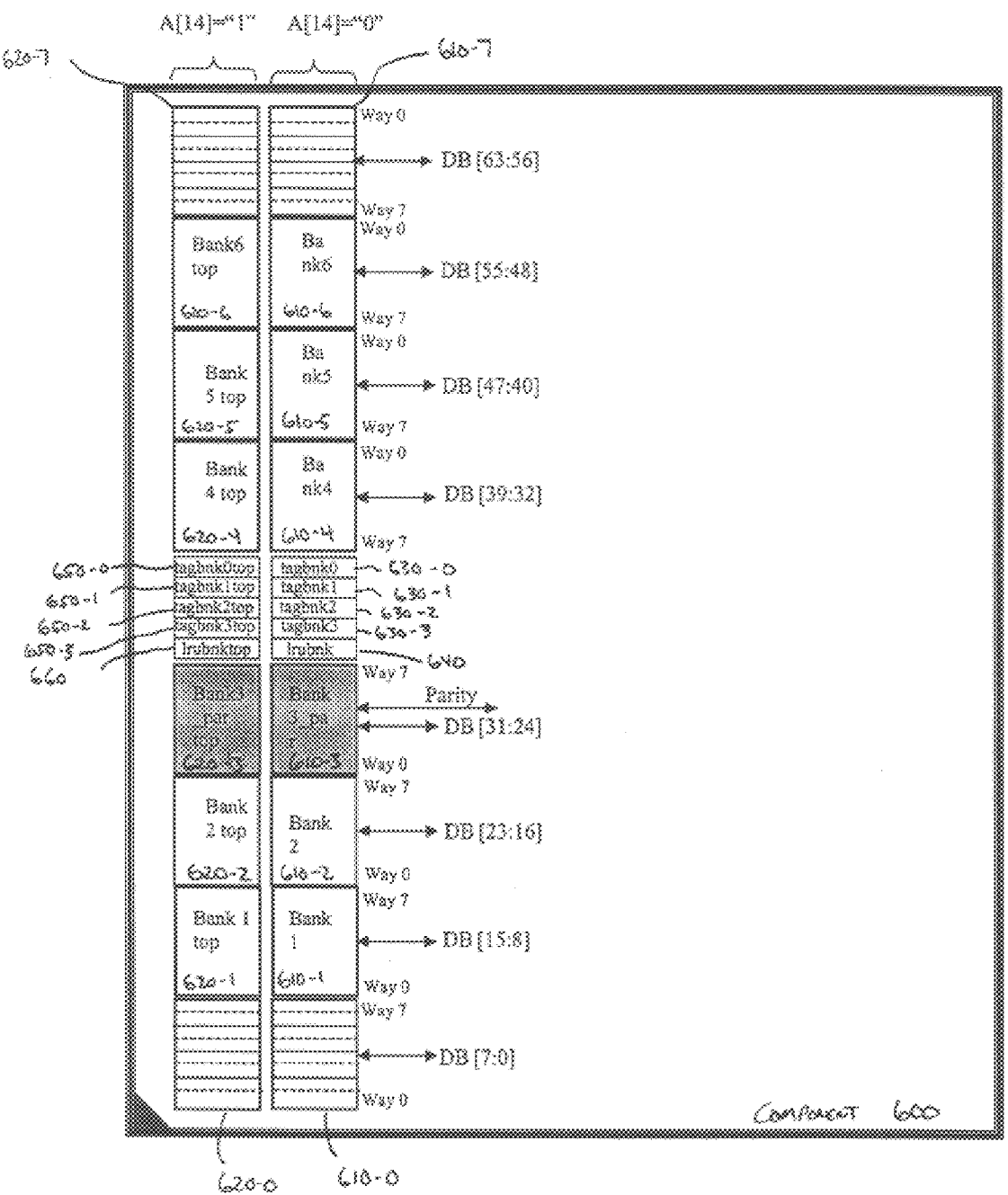
FIG. 6 illustrates one embodiment of a set and way-modular cache.
Figure 7:
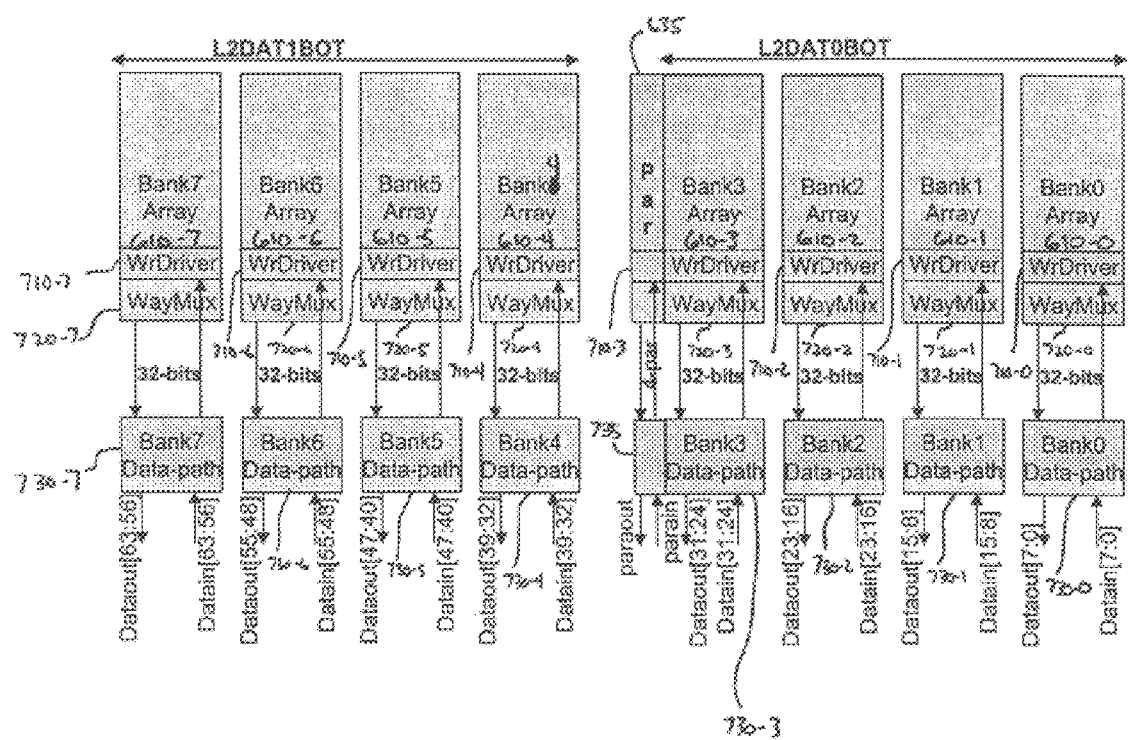
FIG. 7 illustrates further details for a bottom half of one embodiment of the cache of FIG. 6.
Figure 8:
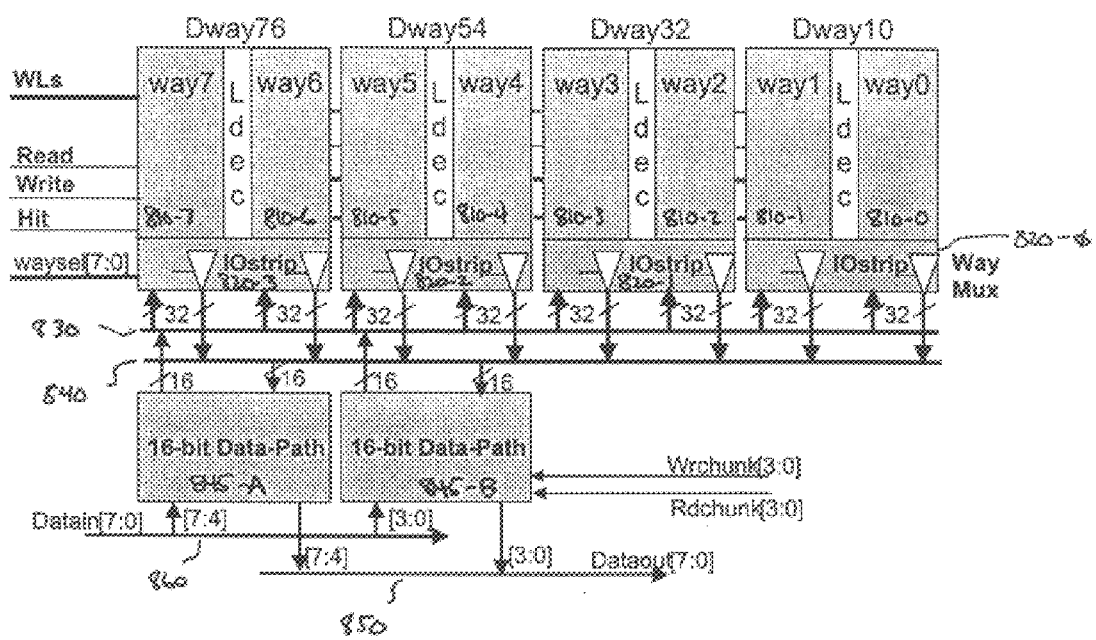
FIG. 8 illustrates further details for one bank for one embodiment of the cache of FIGS. 6–7.

FIGS. 6–8 illustrate an arrangement of data, parity, and tag arrays for one way-modular embodiment. In the embodiment of FIGS. 6–8, the eight ways of the modular cache are interleaved into each sub-array portion. As illustrated in FIG. 6, a component 600 includes both the top and bottom sets of banks. The top half includes top bank0–top bank7, respectively marked 620-0–620-7. The bottom half includes bank0–bank7, respectively marked 610-0–610-7. Bank3 for both the top and bottom includes parity information.

The tag information and least recently used (LRU) information in the illustrated embodiment is included in central portion. Tag Banks 0–3 are respectively provided for the top (650-0–650-3) and for the bottom (630-0–630-3). The top includes LRUBNKTOP 660 and the bottom includes LRUBNK 640 to track least recently used information that allows an efficient cache replacement policy to be implemented.

In the illustrated embodiment, sets 512–1024 are included in the top half (A[14]=1) and sets 0–511 are included in the bottom half (A[14]=0). As shown in detail with respect to banks 0 and 7, way data for each of 8 ways is included in each bank. Thus, each bank (of either the top or the bottom, depending on which set is accessed) provides eight bits of data for a cache access. Bank0 provides bits 7:0 (DB[7:0]), bank1 provides bits 15:8 (DB[15:8]), bank2 provides bits 23:16 (DB[23:16]), and so on. The parity bits may be included with bank3.

As a result of the inclusion of data from each way in each bank, way multiplexer structures may be limited to each bank as illustrated in FIG. 7. Thus, as shown in FIG. 7 for the bottom half of the cache, each bank has a write driver (WrDriver) structure and a way multiplexer (WayMux) structure, respectively labeled 710-0–710-7 and 720-0–720-7 for banks 0–7. A 32-bit interface with data path portions 730-0–7307 for each of banks 0–7 provide data to be read from and written to the cache. Additionally, a parity array 635 is shown associated with bank3 610-3 and a parity data path portion 735 provides parity bits read from and written to the cache.

FIG. 8 illustrates additional details for one embodiment of a bank 610-N. In the embodiment of FIG. 8, way0 810-0 through way7 810-7 are included in the bank 610-N. The ways are organized into groups of two ways (Dway76, Dway54, Dway32, and Dway10). Each group of ways includes a local decoder (LDEC) and a way multiplexer 820-0–820-3. Word lines (WLs), a read start indication (Read), a write start indication (Write), and a hit indication are all provided to the array to perform standard cache read and write operations.

The way multiplexers 820-0–820-3 receive way select signals (waysel[7:0]) and drive data on a data bus 840. The data is bused by two sixteen bit data path portions 845-A and 845-B. These data path portions may include latches, buffers, and/or merely signal routing. In the case of a read operation, read chunk select signals (Rdchunk[3:0]) determine which data is first driven to the data output bus 850 (e.g., the most critically needed chunk may be driven first). In the case of a write cycle, the buffers receive data from the data input bus 860. The data is written a selected chunk at a time according to write chunk select signals (Wrchunk [3:0]). The data is written from the data path portions 845-A and 845-B to a bus 830 from which it may be written to the cache array.

In one embodiment, the layout of the data path (i.e., 845-A, 845-B and associated logic) occupies only one half of the width of the bank 610-N. This arrangement enables a relatively simple reduction of the cache size by removing one to four of the ways. When ways are removed, control logic is configured (e.g., by cache size indicator signals) to not store data in the missing ways. One to four ways may be removed (from all banks), thereby allowing a the flexibility to change the die size in the Y axis, and making the cache way-modular.

Thus, an integral modular cache for a processor is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An integrated circuit comprising:
   a processor portion;
   a cache portion comprising a plurality of banks, each bank having data for a plurality of ways oriented in a first direction and having data path logic occupying only a portion of the width of the bank in the first direction to provide way modularity;
   control logic to operate with a variable number of said plurality of modular array portions in response to a cache size indicator signal.

2. The integrated circuit of claim 1 wherein said cache portion further comprises a plurality of modular set portions.

3. The integrated circuit of claim 2 wherein said control logic comprises variable length tag match logic.

4. The integrated circuit of claim 1 wherein said cache size indicator signal is controlled by a fuse.

5. The integrated circuit of claim 1 wherein said cache further comprises a plurality of signal lines adjacent to an outer edge of said cache portion for interfacing with data lines and at least one hit line from an additional cache portion.

6. A processor comprising:
   a processor portion;
   a cache memory portion comprising:
      an array portion comprising tag logic and a set portion, said array portion extending along substantially all of a first axis of said processor;
      control logic to receive a cache size indicator and capable of operating with said set portion or with additional set portions;
      a plurality of signal lines adjacent to an outer edge of said cache memory portion for interfacing with data lines and at least one hit line from an additional cache memory portion.

7. The processor of claim 6 wherein said control logic comprises a variable length tag matching circuit coupled to receive said cache size indicator and to perform tag matching on a variable number of tag bits based on said cache size indicator.

8. The processor of claim 7 wherein said variable length tag matching circuit comprises a tag truncation circuit coupled to receive said cache size indicator and to set extra tag bits to a predetermined state when tag updates occur and when tag comparisons occur.

9. The processor of claim 7 wherein said cache memory portion further comprises:
   a plurality of banks, each bank having data for a plurality of ways oriented in a first direction and having data path logic occupying only a portion of the width of the bank in the first direction to provide way modularity.

10. The processor of claim 9 wherein said cache memory portion further comprises:
    a second set portion also extending along substantially all of said first axis, said second set portion connecting to said plurality of signal lines.

11. The processor of claim 6 wherein said set portion comprises a plurality of ways, and further wherein said control logic is capable of operating with a variable number of ways based on said cache size indicator.

12. The processor of claim 6 further comprising fused cache size indicator logic that is programmable to generate said cache size indicator.

13. An integrated circuit comprising:
    a processor portion;
    a cache portion, said cache portion comprising a plurality of modules, said cache portion extending for substantially all of a first axis of said integrated circuit, one of said plurality of modules comprising:
       a tag portion coupled to receive a cache size indicator signal and to match a variable number of tag bits based on said cache size indicator signal; and
       a plurality of banks, each bank having data for a plurality of ways oriented in a first direction and having data path logic occupying only a portion of the width of the bank in the first direction to provide way modularity.

14. The integrated circuit of claim 13 wherein said tag portion comprises:
    tag truncation logic to set one or more tag bits to a predetermined value.

15. The integrated circuit of claim 14 further comprising a multiplexer to select data from a module that generates a hit signal, the control logic limiting choices for the multiplexer depending on the cache size indicator signal.

16. The integrated circuit of claim 14 further comprising:
    at least one fuse;
    cache size logic coupled to said fuse to generate said cache size indicator signal as a function of whether or not said at least one fuse has been blown.

* * * * *